(12) United States Patent
Nee

(10) Patent No.: US 8,542,721 B2
(45) Date of Patent: *Sep. 24, 2013

(54) SYSTEM AND METHOD FOR TELEVISION SIGNAL DEMODULATION AND DECODING

(75) Inventor: Chi-Ping Nee, Santee, CA (US)

(73) Assignee: Conexant Systems, Inc., Irvine, CA (US)

(*) Notice: Subject to any disclaimer, the term of this patent is extended or adjusted under 35 U.S.C. 154(b) by 184 days.

This patent is subject to a terminal disclaimer.

(21) Appl. No.: 12/931,862

(22) Filed: Feb. 11, 2011

(65) Prior Publication Data

US 2011/0142175 A1 Jun. 16, 2011

Related U.S. Application Data

(63) Continuation of application No. 12/072,328, filed on Feb. 26, 2008, now Pat. No. 7,907,660.

(51) Int. Cl.
*H04B 1/38* (2006.01)
*H04L 5/16* (2006.01)

(52) U.S. Cl.
USPC ........... 375/222; 375/219; 375/220; 375/340; 375/316; 455/84; 348/555; 348/E5.003; 348/E5.108; 348/E5.113; 348/E5.114

(58) Field of Classification Search
USPC ......... 375/222, 219, 220, 340, 316; 455/466, 455/84; 348/555, E5.003, E5.108, E5.113, 348/E5.114
See application file for complete search history.

(56) References Cited

U.S. PATENT DOCUMENTS

| 7,230,978 B2* | 6/2007 | Bitterlich et al. | 375/219 |
| 7,907,660 B2* | 3/2011 | Nee | 375/222 |
| 2008/0144743 A1* | 6/2008 | Alderson et al. | 375/324 |

* cited by examiner

*Primary Examiner* — Phuong Phu
(74) *Attorney, Agent, or Firm* — Farjami & Farjami LLP

(57) ABSTRACT

A modem for use with a computer having a demodulator and a decoder, the modem comprises a hardware interface; a demodulator front-end having a first input and a first output, the first output of the demodulator front-end being configured to interface with the demodulator of the computer and to provide a demodulated front-end signal to the demodulator over the hardware interface; and a forward error correction (FEC) unit having a second input and a second output, the second input of the FEC unit being configured to interface with the demodulator of the computer and to receive a demodulated signal from the demodulator over the hardware interface, the demodulated signal being a demodulation of the demodulated front-end signal, and the second output of the FEC unit being configured to interface with the decoder of the computer and to provide an FEC signal to the decoder over the hardware interface.

20 Claims, 5 Drawing Sheets

SYSTEM AND METHOD FOR TELEVISION SIGNAL DEMODULATION AND DECODING

The present application is a continuation of U.S. application Ser. No. 12/072,328, filed Feb. 26, 2008 now U.S. Pat. No. 7,907,660.

BACKGROUND OF THE INVENTION

1. Field of the Invention

The present invention relates to communication systems. More particularly, the present invention relates to television signal demodulating and decoding systems.

2. Background Art

Today, with the aid of special-purpose devices or modems, personal computers can be utilized as viewing devices for television signals. Special-purpose devices or modems are required because many of the demodulating and decoding tasks that must be performed to render a television signal viewable are not effectively performed by general-purpose personal computer software. Thus, in the present state of the art, the various demodulation and decoding tasks are performed in two phases, separated by a modem-to-computer communication task. A modem will perform an initial subset of the tasks required to demodulate and decode a television signal, and then the modem will communicate the modem result to a personal computer. The personal computer will then perform of the remaining tasks in software to finish demodulating and decoding the television signal, thereby rendering it viewable for the user.

FIG. 1a illustrates conventional demodulation and decoding system 100. As shown in FIG. 1, system 100 includes television signal source 101, which broadcasts television signal 102 for reception by modem 103. Modem 103 of system 100 performs a subset of the demodulating and decoding tasks to generate modem result 104. Next, modem result 104 from modem 103 is received by personal computer 105, which performs the remaining demodulating and decoding tasks to generate viewable signal 106 to be displayed by personal computer 105 for viewing by user 107.

FIG. 1b illustrates conventional system 108 for demodulating and decoding television signals. As shown, conventional system 108 includes modem 110 and computer 120, which correspond to modem 103 and personal computer 105 of system 100, respectively. In operation, analog television signal 128 arrives at analog-to-digital converter 130 of modem 110 for demodulation and decoding. Analog-to-digital converter 130 then converts analog television signal 128 into a digital form suitable for processing by demodulator 140, by generating digital television signal 132. Demodulator 140 receives digital television signal 132 and performs a suitable demodulation on digital television signal 132, depending on the type of analog television signal 128. For instance, demodulator 140 may be able to demodulate single carrier television signals, OFDM televisions signals, or others, although in a particular implementation, demodulator 140 may only be able to demodulate one type of signal. Continuing with FIG. 1b, demodulator 140 generates demodulated television signal 142 by demodulating digital television signal 132. Subsequently, forward error correction 150 of modem 110 receives demodulated television signal 142 and applies a forward error correction (FEC) protocol to demodulated television signal 142 by, for example, utilization of a viterbi decoder or a reed-solomon decoder, thereby generating FEC television signal 152. Modem 110 provides FEC television signal 152 to computer 120 via a computer or a hardware interface (not shown), such as a PCI-e bus. As shown, computer 120 includes software decoder 160 that receives FEC television signal 152. While being executed on a processor (not shown) in computer 120, software decoder 160 performs a decoding operation on FEC television signal 152, such as MPEG decoding, to generate decoded television signal 162.

A serious drawback of conventional system 108 is that the conventional systems for demodulating and decoding television signals incur large costs for redesigning modem implementations. This is because new and different modulation schemes are being introduced on an ongoing basis, and the present division of the tasks between the modem and the personal computer in conventional systems requires new modem designs for keeping up with the evolving schemes. Therefore, there is a need in the art for a modem and computer combination that obviates the drawbacks and inefficiencies inherent in such present state of the art systems.

SUMMARY OF THE INVENTION

There is provided methods and systems for television signal demodulating and decoding, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 1b shows certain internal components of the conventional system of FIG. 1a;

DETAILED DESCRIPTION OF THE INVENTION

Although the invention is described with respect to specific embodiments, the principles of the invention can obviously be applied beyond the specifically described embodiments of the invention described herein. Moreover, in the description of the present invention, certain details have been left out to not obscure the inventive aspects of the invention. The details left out are within the knowledge of a person of ordinary skill in the art. The drawings in the present application and their accompanying detailed description are directed to merely example embodiments of the invention. To maintain brevity, other embodiments of the invention which use the principles of the present invention are not specifically described in the present application and are not specifically illustrated by the present drawings.

Figure 1A:
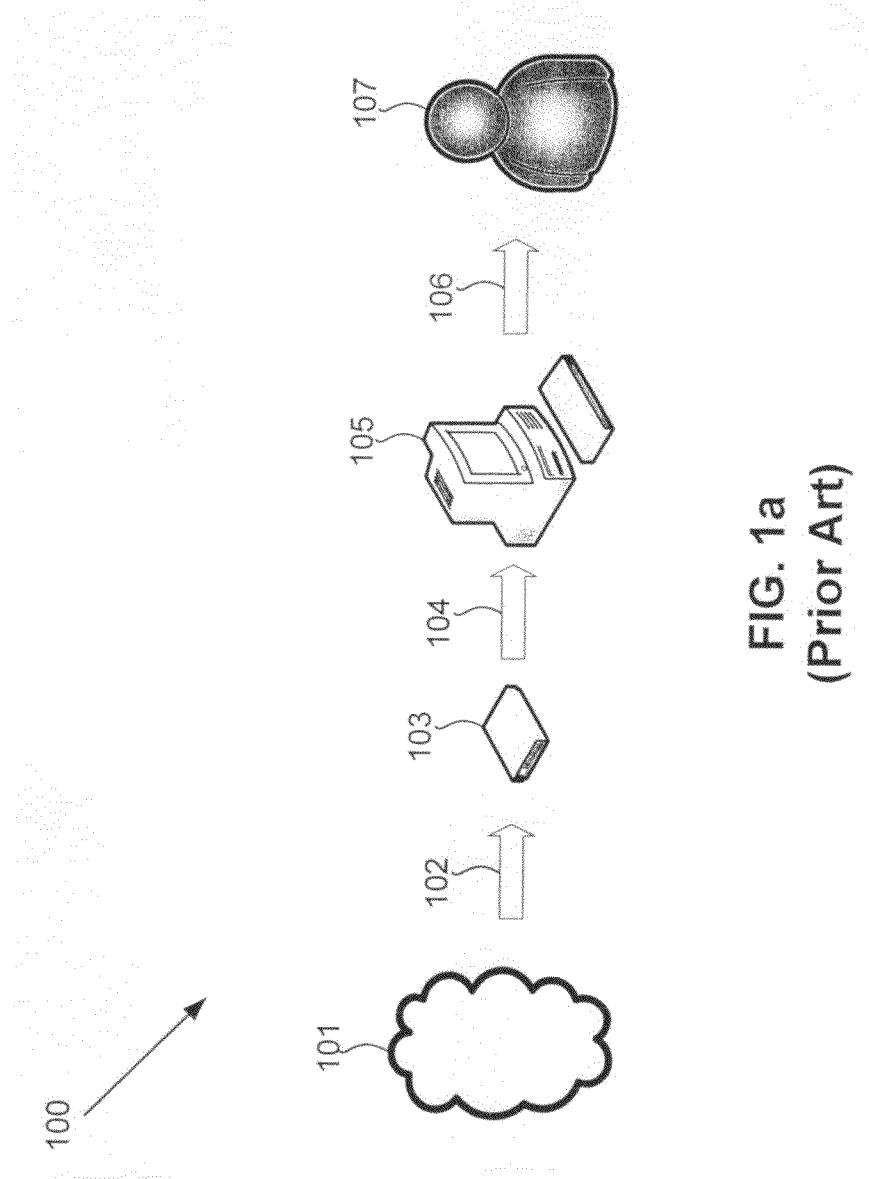
FIG. 1a shows a conventional system for demodulating and decoding television signals.
Figure 1B:
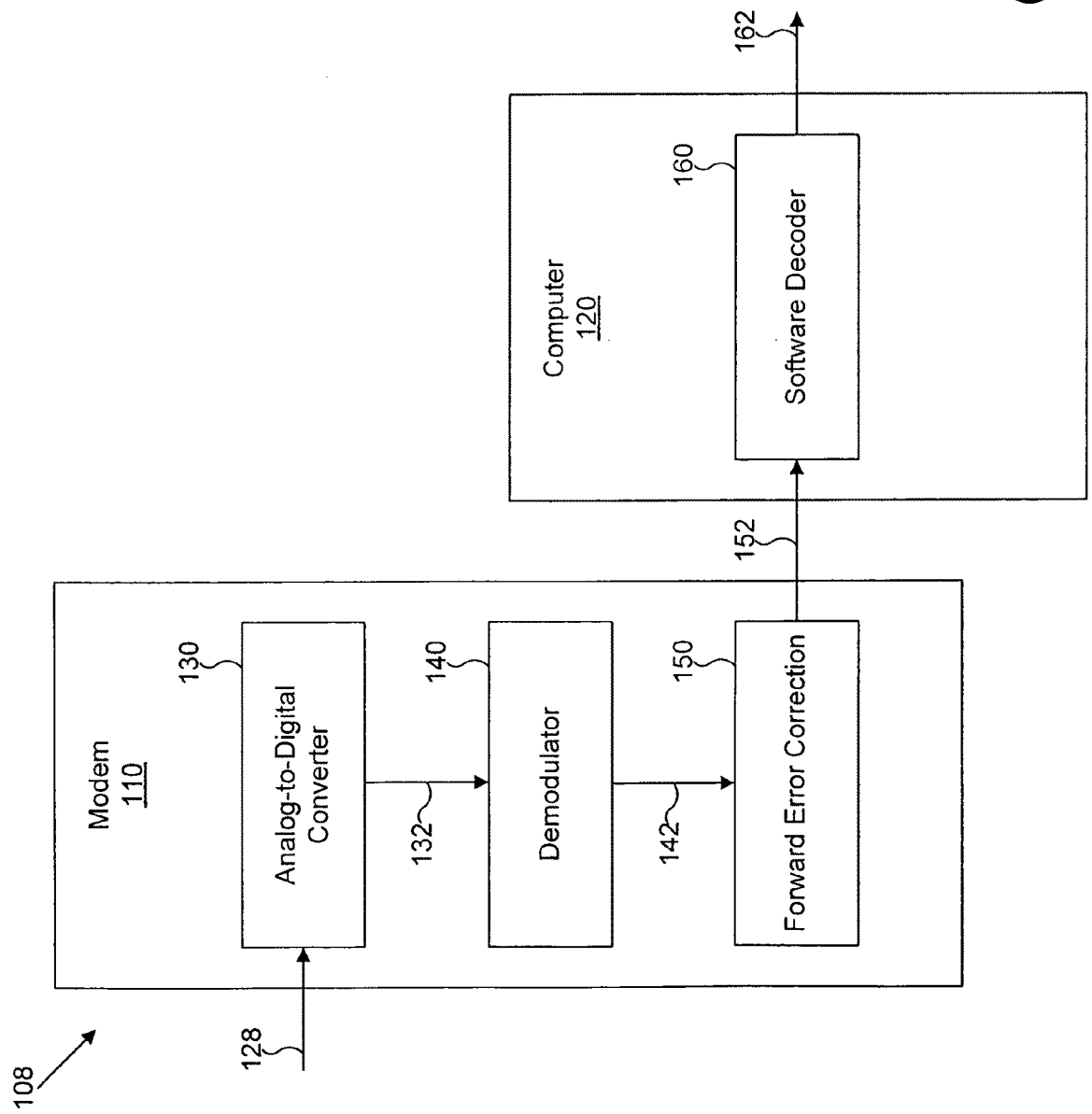
Figure 2:
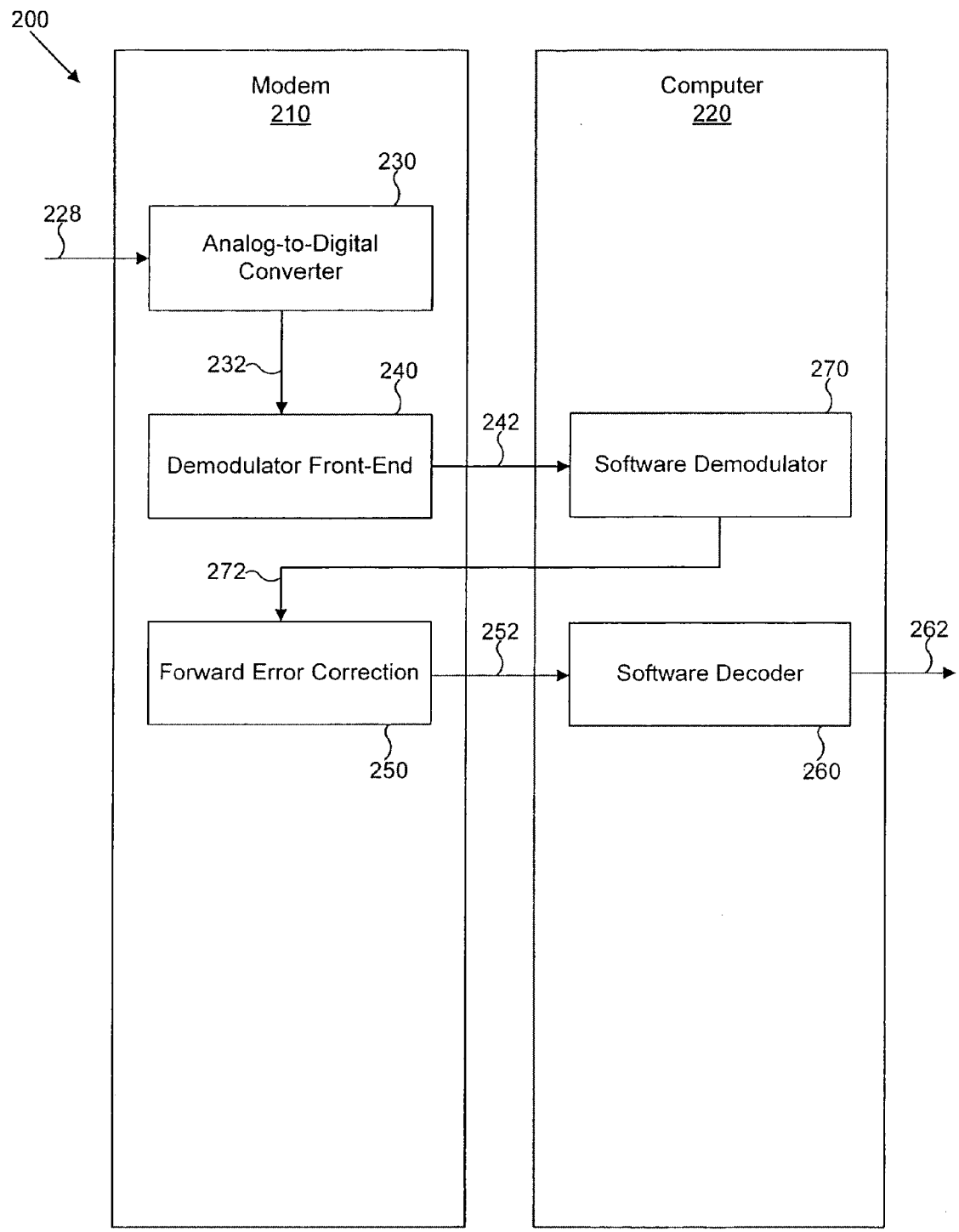
FIG. 2 shows a system for demodulating and decoding television signals, in accordance with one embodiment of the invention.

FIG. 2 illustrates system 200 for demodulating and decoding television signals, in accordance with one embodiment of the invention. As shown, system 200 includes modem 210 and computer 220. Computer 220 can be, for instance, a personal computer, a PDA, a cell phone, or another kind of computing device. In operation, analog television signal 228 arrives at analog-to-digital converter 230 of modem 210 for demodulation and decoding. Analog-to-digital converter 230 converts analog television signal 228 into a digital form suitable for processing by demodulator front-end 240, by generating digital television signal 232. Next, digital television signal 232 is received by demodulator front-end 240. Demodulator front-end 240 performs a number of preprocessing steps on digital television signal 232 to generate demodulated front-end television signal 242. Modem 210 provides demodulated front-end television signal 242 to computer 220 via a computer interface (not shown), such as a PCI-e bus. Further, modem 210 may include a processor (not shown) for the performance one or more of the above tasks or execution of software modules for the performance of such tasks.

Located within a memory (not shown) of computer 220, software demodulator 270 receives demodulated front-end television signal 242 over the computer interface and performs a demodulating operation on demodulated front-end television signal 242. The demodulating operation, such as single carrier demodulation or OFDM demodulation, can be performed by executing software demodulator 270 on a processor (not shown) in computer 220. Because software demodulator 270 is located in computer 220, software demodulator 270 can be reconfigured more easily to accommodate various types of television signal modulation schemes. Furthermore, software demodulator 270 can also be reconfigured to accommodate various levels of complexity in demodulator front-end 240. For instance, a given embodiment of the invention might perform a few demodulation steps in demodulator front-end 240, and the remaining steps in software demodulator 270. Another embodiment of the invention might be configured with more demodulation steps being performed by demodulator front-end 240. Continuing with system 200, after software demodulator 270 has finished demodulating demodulated front-end television signal 242, software demodulator 270 sends demodulated television signal 272 back to modem 210 via the computer interface.

Inside modem 210, forward error correction 250 receives demodulated television signal 272 and applies a forward error correction (FEC) protocol to demodulated television signal 272 by, for example, utilization of a viterbi decoder or a reed-solomon decoder, thereby generating FEC television signal 252. Modem 210 provides FEC television signal 252 back to computer 220 via the computer interface. Inside computer 220, software decoder 260 receives FEC television signal 252 and performs a decoding operation on FEC television signal 252, such as MPEG decoding, to generate decoded television signal 262.

By transitioning back and forth between modem 210 to computer 220, system 200 avoids the drawbacks in conventional system 108, which provides a single break in the processing between modem 110 and computer 120. Specifically, by allowing for more than one transition across the computer interface between modem 210 and computer 220, system 200 overcomes an arbitrary division of tasks between modem 210 and computer 220. This innovative approach is superior to that utilized in conventional system 108, which provides for an arbitrary division of tasks between modem 110 and computer 120 as a result of limiting the demodulation and decoding process transactions over the computer interface between modem 210 and computer 220 to a single transaction.

Figure 3:
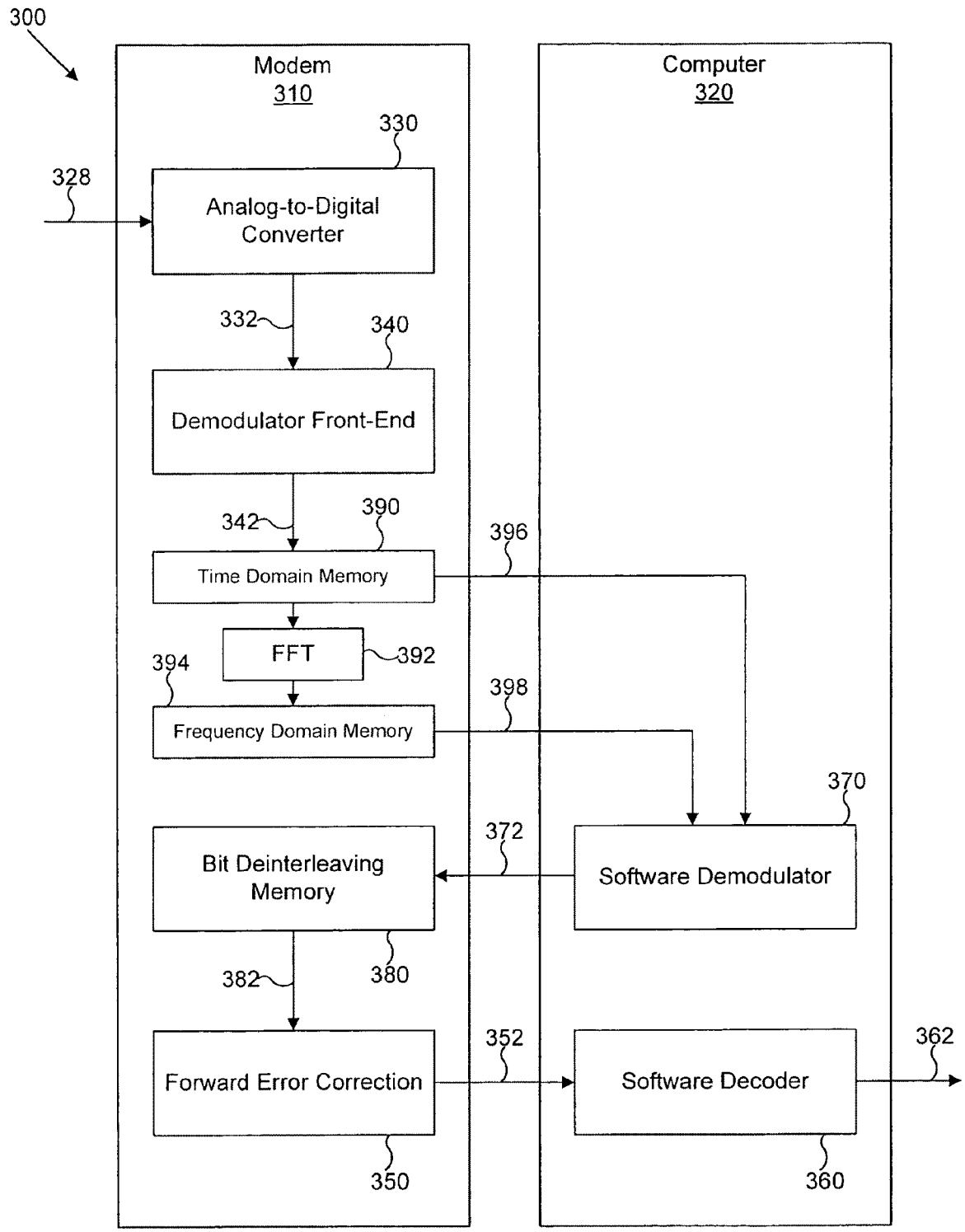
FIG. 3 shows a system for demodulating and decoding television signals, in accordance with another embodiment of the invention.

FIG. 3 illustrates system 300 for demodulating and decoding television signals, in accordance with another embodiment of the invention. Modem 310 and computer 320 correspond to modem 210 and computer 220 in FIG. 2. In operation, analog television signal 328 arrives at analog-to-digital converter 330 of modem 310 for demodulation and decoding. Analog-to-digital converter 330 converts analog television signal 328 into a digital form suitable for processing by demodulator front-end 340, by generating digital television signal 332. Digital television signal 332 is received by demodulator front-end 340, which performs preprocessing steps on digital television signal 332, such as applying a DC notch filter, a rotator, or a decimation filter, thereby producing demodulator front-end television signal 342. Demodulator front-end television signal 342 may be received by time domain memory 390. Time domain memory 390 may store demodulator front-end television signal 342 during periods of time when software demodulator 370 of computer 320 is not ready to receive an input. Time domain memory 390 may be coupled to fast Fourier transform 392, which if required can receive the contents of time domain memory 390 and generate a frequency-domain representation of that data for storage in frequency domain memory 394. Frequency domain memory 394, like time domain memory 390, may store information for periods of time when software demodulator 370 of computer 320 is not ready to receive an input. When software demodulator 370 of computer 320 is ready to receive an input, time domain memory 390 or frequency domain memory 394 can output stored time domain television signal 396 or stored frequency domain television signal 398, respectively. Modem 310 can send stored time domain television signal 396 or stored frequency domain television signal 398 to computer 320 via a computer interface (not shown), such as a PCI-e bus.

Inside computer 320, software demodulator 370 receives stored time domain television signal 396 or stored frequency domain television signal 398 for single carrier demodulation, OFDM demodulation, or another demodulation protocol, and generates demodulated television signal 372. Software demodulator 370, being implemented in software like software demodulator 270, can be reconfigured to accommodate different modulation schemes and demodulator front-end 340 complexity levels. After software demodulator 370 generates demodulated television signal 372, computer 320 sends demodulated television signal 372 back to modem 310 via the computer interface.

Inside modem 310, demodulated television signal 372 is received by bit deinterleaving memory 380. In some embodiments, demodulated television signal 372 contains interleaved information. To deinterleave the information into bit deinterleaving memory 380, computer 320 may send demodulated television signal 372 via the computer interface configured as a PCI-e bus and further configured as a smart direct memory access controller (not shown) that can perform a deinterleaving operation. After receiving demodulated television signal 372, bit deinterleaving memory 380 generates deinterleaved television signal 382. Forward error correction 350 receives deinterleaved television signal 382 and applies a FEC protocol to deinterleaved television signal 382 by, for example, utilization of a viterbi decoder or a reed-solomon decoder, thereby generating FEC television signal 352. Modem 310 sends back FEC television signal 352 to computer 320 via the computer interface. Inside computer 320, software decoder 360 receives FEC television signal 352 and performs a decoding operation on FEC television signal 352, such as MPEG decoding, to generate decoded television signal 362.

Figure 4:
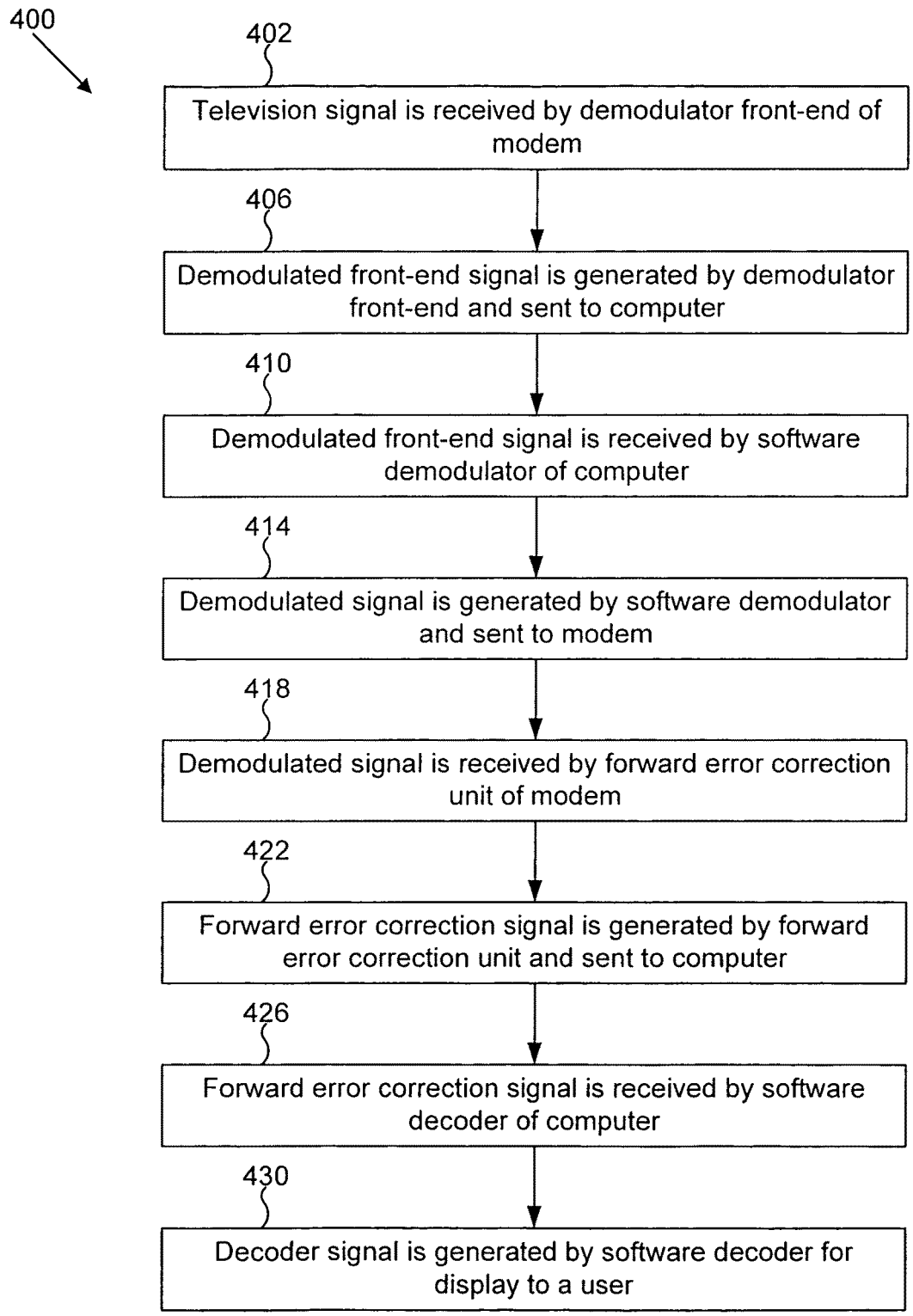
FIG. 4 shows a flow diagram of a method for demodulating and decoding television signals, in accordance with an embodiment of the invention.

FIG. 4 illustrates a flow diagram of method 400 for demodulating and decoding television signals, according to an embodiment of the present invention. As shown, method 400 starts at step 402, where a television signal is received by a demodulator front-end of a modem. In step 406, a demodulated front-end signal is generated by the demodulator front-end and sent to a computer. In step 410, the demodulated front-end signal is received by a software demodulator of the computer. In step 414, a demodulated signal is generated by the software demodulator and sent back to the modem. In step 418, the demodulated signal is received by a forward error correction unit of the modem. In step 422, a forward error correction signal is generated by the forward error correction unit and sent back to the computer. In step 426, the forward error correction signal is received by a software decoder of the computer. Finally, in step 430, a decoded signal is generated by the software decoder for display to a user.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

The invention claimed is:

1. A modem for use with a computer, said modem comprising:
   a hardware interface;
   a demodulator front-end configured to receive a digital television signal, wherein said demodulator front-end is configured to demodulate said digital television signal to generate a demodulated front-end signal;
   a time domain memory configured to store said demodulated front-end signal in time domain;
   a fast Fourier transform (FFT) configured to apply FFT to said demodulated front-end signal; and
   a frequency domain memory for storing said demodulated front-end signal in frequency domain;
   wherein said modem is configured to provide said demodulated front-end signal in time domain and frequency domain signal to said computer over said hardware interface.

2. The modem of claim 1, wherein said hardware interface is a PCI-e bus interface.

3. The modem of claim 1 further comprising:
   a smart direct memory access controller for deinterleaving data in said demodulated signal; and
   a bit-deinterleaving memory for storing said demodulated signal.

4. The modem of claim 1, wherein said modem is configured to provide said demodulated front-end signal in time domain and frequency domain signal to a demodulator of said computer.

5. The modem of claim 4, wherein said modem is configured to receive a demodulated signal from said demodulator over said hardware interface, said demodulated signal being a demodulation of said demodulated front-end signal, and wherein said modem is configured to apply a process to said demodulated signal to generate a processed demodulated signal, and transmit said processed demodulated signal to said computer over said hardware interface.

6. A modem for use with a computer having a demodulator, said modem comprising:
   a hardware interface;
   a digital-to-analog converter configured to receive an analog television signal and generate a digital television signal; and
   a smart direct memory access controller;
   wherein said modem is configured to provide said digital television signal to said computer over said hardware interface;
   wherein said modem is further configured to receive a demodulated signal from said demodulator over said hardware interface, said demodulated signal being a demodulation of said digital television signal;
   wherein said smart direct memory access controller is configured to deinterleave data in said demodulated signal to generate deinterleaved demodulated data; and
   wherein said modem is configured to provide said deinterleaved demodulated signal to said computer over said hardware interface.

7. The modem of claim 6, wherein said hardware interface is a PCI-e bus interface.

8. The modem of claim 6 further configured to apply forward error correction to said deinterleaved demodulated data prior to providing said deinterleaved demodulated data to said computer over said hardware interface.

9. The modem of claim 6 further comprising a bit-deinterleaving memory for storing said demodulated signal.

10. The modem of claim 6, wherein said deinterleaved demodulated signal is an encoded form for decoding by a decoder of said computer.

11. A method for use by a modem for communication with a computer, said method comprising:
    receiving a digital television signal;
    demodulating said digital television signal, using a demodulator front-end, to generate a demodulated front-end signal;
    storing said demodulated front-end signal in time domain using a time domain memory;
    applying fast Fourier transform (FFT) to said demodulated front-end signal;
    storing said demodulated front-end signal in frequency domain using a frequency domain memory;
    transmitting said demodulated front-end signal in time domain and frequency domain to said computer over a hardware interface.

12. The method of claim 11, wherein said hardware interface is a PCI-e bus interface.

13. The method of claim 11 further comprising:
    deinterleaving data in said demodulated signal using a smart direct memory access controller; and
    storing said demodulated signal using a bit-deinterleaving memory.

14. The method of claim 11, wherein said transmitting transmits said demodulated front-end signal in time domain and frequency domain to a demodulator of said computer over a hardware interface.

15. The method of claim 14 further comprising:
    receiving a demodulated signal from said demodulator over said hardware interface, said demodulated signal being a demodulation of said demodulated front-end signal;
    applying a process to said demodulated signal to generate a processed demodulated signal; and
    transmitting said processed demodulated signal to said computer over said hardware interface.

16. A method for use by a modem for communication with a computer having a demodulator, said method comprising:

converting an analog television signal to a digital television signal;

providing said digital television signal to said computer over a hardware interface;

receiving a demodulated signal from said demodulator over said hardware interface, said demodulated signal being a demodulation of said digital television signal;

deinterleaving data in said demodulated signal to generate a deinterleaved demodulated signal; and providing said deinterleaved demodulated signal to said computer over said hardware interface.

17. The method of claim 16, wherein said hardware interface is a PCI-e bus interface.

18. The method of claim 16 further comprising applying forward error correction to said deinterleaved demodulated data prior to said providing said deinterleaved demodulated data to said computer over said hardware interface.

19. The method of claim 16 further comprising storing said demodulated signal using a bit-deinterleaving memory.

20. The method of claim 16, wherein said deinterleaved demodulated signal is an encoded form for decoding by a decoder of said computer.

* * * * *